United States Patent
Lv et al.

(10) Patent No.: US 12,276,886 B2
(45) Date of Patent: Apr. 15, 2025

(54) CURVED DISPLAY PANEL AND DISPLAY DEVICE

(71) Applicant: Wuhan China Star Optoelectronics Technology Co., Ltd., Hubei (CN)

(72) Inventors: Jing Lv, Hubei (CN); Teng Wu, Hubei (CN); Li Zhang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 18/470,450

(22) Filed: Sep. 20, 2023

(65) Prior Publication Data
US 2024/0118576 A1   Apr. 11, 2024

(30) Foreign Application Priority Data

Oct. 11, 2022  (CN) .......................... 202211241174.8

(51) Int. Cl.
G02F 1/1343   (2006.01)
G02F 1/1333   (2006.01)
G02F 1/1362   (2006.01)

(52) U.S. Cl.
CPC .. *G02F 1/134345* (2021.01); *G02F 1/133305* (2013.01); *G02F 1/136209* (2013.01); *G02F 1/136286* (2013.01)

(58) Field of Classification Search
None
See application file for complete search history.

(56) References Cited

U.S. PATENT DOCUMENTS

2011/0141424 A1* 6/2011 Lee .......................... C09K 19/44
349/141
2020/0333674 A1* 10/2020 Zhao ..................... H01L 27/124

FOREIGN PATENT DOCUMENTS

| CN | 103293809 A | 9/2013 |
|---|---|---|
| CN | 104035224 A | 9/2014 |
| CN | 105702193 A | 6/2016 |
| CN | 209014874 U | 6/2019 |
| CN | 111162114 A | 5/2020 |
| CN | 111474758 A | 7/2020 |
| CN | 112782886 A | 5/2021 |
| WO | 2009148006 A1 | 12/2009 |

OTHER PUBLICATIONS

Chinese Office Action issued in corresponding Chinese Patent Application No. 202211241174.8 dated Aug. 4, 2023, pp. 1-7.

* cited by examiner

*Primary Examiner* — Dung T Nguyen
(74) *Attorney, Agent, or Firm* — Nathan & Associates; Menachem Nathan (57) ABSTRACT

A curved display panel includes a first substrate, pixel units disposed on the first substrate, and black matrices disposed on a side of the sub-pixel away from the first substrate. Each of the pixel units includes a plurality of sub-pixels disposed in an array along a first direction and a second direction, each of the sub-pixels includes a long side and a short side, the long side extends along the first direction, the short side extends along the second direction. Each of the black matrices includes a first sub-part and a second sub-part, an orthographic projection of the first sub-part on the first substrate is located at an interval between orthographic projections of two adjacent sub-pixels on the first substrate, and an orthographic projection of the second sub-part on the first substrate overlaps with an orthographic projection of the short side of the sub-pixel on the first substrate.

16 Claims, 5 Drawing Sheets

CURVED DISPLAY PANEL AND DISPLAY DEVICE

CROSS REFERENCE TO RELATED APPLICATIONS

This application claims priority to Chinese Patent Application No. 202211241174.8, filed on Oct. 11, 2022, and entitled "CURVED DISPLAY PANEL AND DISPLAY DEVICE". The entire disclosures of the above application are incorporated herein by reference.

TECHNICAL FIELD

The present application relates to the field of display technology, in particular to a curved display panel and a display device.

BACKGROUND

Compared with traditional flat display panels, curved display panels fit a physiological curvature of human eyes better and can greatly enhance a user's sense of being wrapped and immersed when viewing. In addition to the different visual experience, the curved display panel gives people a wider field of view, because a slightly curved edge can be closer to the user, and a viewing angle is basically the same as that in the center of the curved display panel.

At present, the processing method of the curved display panel is generally to attach the display panel to a cover plate with a curved surface to make it bend. Taking a liquid crystal display panel as an example, when the liquid crystal display panel is bent, due to the different bending curvatures of a color filter substrate and an array substrate, a black matrix in the color filter substrate and the array substrate may be offset, thereby causing light leakage and color mixing issues. In order to avoid light leakage, the black matrix may be widened in the display panel, however, the widening of the black matrix may lead to a decrease in an aperture ratio of the display panel.

SUMMARY

Embodiments of the present invention provide a curved display panel and a display device to solve the technical problem that the existing curved display panel improves light leakage and color mixing by widening the black matrix but reduces an aperture ratio of the curved display panel.

In order to solve the above issues, technical solutions provided by the present invention are as follows:

The present invention provides a curved display panel, comprising:

a first substrate;

a plurality of pixel units disposed on the first substrate, wherein each of the pixel units comprises a plurality of sub-pixels disposed in an array along a first direction and a second direction, each of the sub-pixels comprises a long side and a short side, the long side extends along the first direction, the short side extends along the second direction, the first direction is a direction of a curved surface of the curved display panel, and the second direction is perpendicular to the first direction; and a plurality of black matrices disposed on a side of the sub-pixel away from the first substrate, each of the black matrices comprises a first sub-part and a second sub-part, an orthographic projection of the first sub-part on the first substrate is located at an interval between orthographic projections of two adjacent sub-pixels on the first substrate, and an orthographic projection of the second sub-part on the first substrate overlaps with an orthographic projection of the short side of the sub-pixel on the first substrate.

The curved display panel according to the present invention, the first substrate is provided with a plurality of scan lines extending along the first direction and a plurality of data lines extending along the second direction, an intersection of the scan line and the data line defines the pixel unit; two adjacent pixel units disposed along the first direction are driven by two scan lines.

The curved display panel according to the present invention, defining two adjacent pixel units disposed along the first direction as a first pixel unit and a second pixel unit, and the two scan lines driving the first pixel unit and the second pixel unit are a first scan line and a second scan line;

the first pixel unit and the second pixel unit respectively comprise three sub-pixels disposed along the second direction, the two sub-pixels on both sides are connected to one of the first scan line and the second scan line, the sub-pixel located in a middle is connected to the other one of the first scan line and the second scan line.

The curved display panel according to the present invention, each of the scan lines comprises a connected first branch and a second branch, and the first branch extends along the first direction;

the second branch comprises a first subsection and a second subsection, the first subsection is located between and connected to the first branch and the second subsection, the first subsection extends along the second direction, the second subsection extends along the first direction, and the first branch and the second subsection are separated by two rows of the sub-pixels disposed along the first direction.

The curved display panel according to the present invention, two adjacent pixel units disposed along the first direction are driven by three data lines, and the three data lines are defined as a first data line, a second data line, and a third data line;

the first data line is located on a side of the first pixel unit away from the second pixel unit, the second data line is located on a side of the second pixel unit away from the first pixel unit, and the third data line is located between the first pixel unit and the second pixel unit;

wherein the third data line is connected to any one of the sub-pixels in the first pixel unit and any one of the sub-pixels in the second pixel unit, the first data line is connected to all the sub-pixels in the first pixel unit that are not connected to the third data line, and the second data line is connected to all the sub-pixels in the second pixel unit that are not connected to the third data line.

The curved display panel according to the present invention, the curved display panel further comprises:

a first metal layer disposed on a side of the first substrate and comprising the scan lines;

an insulating layer disposed on a side of the first metal layer away from the first substrate; and a second metal layer disposed on a side of the insulating layer away from the first substrate and comprising the data line and conversion line, wherein the data line and the conversion line do not overlap;

wherein the scan line is electrically connected to the conversion line through a via hole penetrating through the insulating layer.

The curved display panel according to the present invention, the conversion line comprises a first conversion line and a second conversion line, and the via hole comprises a first via hole and a second via hole;

the second subsection is electrically connected to the first conversion line through the first via hole, the first branch is electrically connected to the second conversion line through the second via hole, and the first conversion line and the second conversion line extend along the first direction.

The curved display panel according to the present invention, the second metal layer further comprises a connection line, the connection line electrically connects the first conversion line and the second conversion line, and the connection line extends along the second direction.

The curved display panel according to the present invention, the curved display panel further comprises:

a second substrate disposed opposite to the first substrate; and a liquid crystal layer disposed between the first substrate and the second substrate;

wherein the black matrices are disposed on a side of the second substrate close to the first substrate.

The present invention provides a display device comprising the above curved display panel.

In details, the curved display panel comprises:

a first substrate;

a plurality of pixel units disposed on the first substrate, wherein each of the pixel units comprises a plurality of sub-pixels disposed in an array along a first direction and a second direction, each of the sub-pixels comprises a long side and a short side, the long side extends along the first direction, the short side extends along the second direction, the first direction is a direction of a curved surface of the curved display panel, and the second direction is perpendicular to the first direction; and a plurality of black matrices disposed on a side of the sub-pixel away from the first substrate, each of the black matrices comprises a first sub-part and a second sub-part, an orthographic projection of the first sub-part on the first substrate is located at an interval between orthographic projections of two adjacent sub-pixels on the first substrate, and an orthographic projection of the second sub-part on the first substrate overlaps with an orthographic projection of the short side of the sub-pixel on the first substrate.

The display device according to the present invention, first substrate is provided with a plurality of scan lines extending along the first direction and a plurality of data lines extending along the second direction, an intersection of the scan line and the data line defines the pixel unit; two adjacent pixel units disposed along the first direction are driven by two scan lines.

The display device according to the present invention, defining two adjacent pixel units disposed along the first direction as a first pixel unit and a second pixel unit, and the two scan lines driving the first pixel unit and the second pixel unit are a first scan line and a second scan line, the first scan line and the second scan line;

the first pixel unit and the second pixel unit respectively comprise three sub-pixels disposed along the second direction, the two sub-pixels on both sides are connected to one of the first scan line and the second scan line, the sub-pixel located in a middle is connected to the other one of the first scan line and the second scan line.

The display device according to the present invention, each of the scan lines comprises a connected first branch and a second branch, and the first branch extends along the first direction;

the second branch comprises a first subsection and a second subsection, the first subsection is located between and connected to the first branch and the second subsection, the first subsection extends along the second direction, the second subsection extends along the first direction, and the first branch and the second subsection are separated by two rows of the sub-pixels disposed along the first direction.

The display device according to the present invention, two adjacent pixel units disposed along the first direction are driven by three data lines, and the three data lines are defined as a first data line, a second data line, and a third data line;

the first data line is located on a side of the first pixel unit away from the second pixel unit, the second data line is located on a side of the second pixel unit away from the first pixel unit, and the third data line is located between the first pixel unit and the second pixel unit;

the third data line is connected to any one of the sub-pixels in the first pixel unit and any one of the sub-pixels in the second pixel unit, the first data line is connected to all the sub-pixels in the first pixel unit that are not connected to the third data line, and the second data line is connected to all the sub-pixels in the second pixel unit that are not connected to the third data line.

The display device according to the present invention, the curved display panel further comprises:

a first metal layer disposed on a side of the first substrate and comprising the scan lines;

an insulating layer disposed on a side of the first metal layer away from the first substrate; and a second metal layer disposed on a side of the insulating layer away from the first substrate and comprising the data line and conversion line, wherein the data line and the conversion line do not overlap;

wherein the scan line is electrically connected to the conversion line through a via hole penetrating through the insulating layer.

The display device according to the present invention, the conversion line comprises a first conversion line and a second conversion line, and the via hole comprises a first via hole and a second via hole;

the second subsection is electrically connected to the first conversion line through the first via hole, the first branch is electrically connected to the second conversion line through the second via hole, and the first conversion line and the second conversion line extend along the first direction.

The display device according to the present invention, the second metal layer further comprises a connection line, the connection line electrically connects the first conversion line and the second conversion line, and the connection line extends along the second direction.

The display device according to the present invention, the curved display panel further comprises:

a second substrate disposed opposite to the first substrate; and a liquid crystal layer disposed between the first substrate and the second substrate;

wherein the black matrices are disposed on a side of the second substrate close to the first substrate.

The display device according to the present invention, the curved display panel is a touch display panel, and the curved display panel further comprises a touch wire, and the touch wire is disposed between two adjacent columns of the sub-pixels and extends along the second direction.

The display device according to the present invention, the curved display panel further comprises:
a backlight module, wherein the backlight module is disposed on a side away from a light emitting surface of the curved display panel, and the backlight module has a curved structure.

The beneficial effects of the present invention are that: The curved display panel and the display device provided by the present invention extend the long side of each sub-pixel along the curved direction of the curved display panel. The orthographic projection of the first sub-part of the black matrix on the first substrate is located at the interval between the orthographic projections of two adjacent sub-pixels on the first substrate. The orthographic projection of the second sub-part on the first substrate overlaps with the orthographic projection of the short side of the sub-pixel on the first substrate. In order to improve light leakage and color mixing issues caused by the offset between the color filter substrate and the array substrate, each black matrix needs to be widened. However, the short side of the black matrix in the present invention is widened, which is beneficial to reduce the area of the widened part of the black matrix compared with the widening of the long side in the prior art. This can reduce a loss of an aperture ratio of each sub-pixel, thereby improving an overall aperture ratio of the curved display panel.

BRIEF DESCRIPTION OF THE DRAWINGS

In order to illustrate the technical solutions more clearly in the embodiments of the present application, the following briefly introduces the drawings that need to be used in the description of the embodiments. Obviously, the drawings in the following description are only some embodiments of the present application. For those skilled in the art, other drawings can also be obtained based on these drawings without any creative effort.

EXPLANATION OF REFERENCE NUMERALS

AA Display area; NA Non-display area; D1 First direction; D2 Second direction; 1 First substrate; 2 Pixel unit; 21 First pixel unit; 22 Second pixel unit; 201 Sub-pixel; 201a Long side; 201b Short side; 3 Black matrix; 31 First sub-part; 32 Second sub-part; 4 Scan line; 41 First scan line; 42 Second scan line; 401 First branch; 402, Second branch; 4021 First subsection; 4022 Second subsection; 5 Data line; 51 First data line; 52 Second data line; 53 Third data line; 6 Via hole; 61 First via hole; 62 Second via hole; 7 Demultiplexer; 8 Conversion line; 81 First conversion line; 82 Second conversion line; 9 Connection line; 10 Insulating layer; 11 Interlayer dielectric layer; M1 First metal layer; M2 Second metal layer; 12. Second substrate; 13 Liquid crystal layer; 14 Color resist.

Detailed Description of Illustrated Embodiments

The following will clearly and completely describe the technical solutions in the embodiments of the present invention with reference to the drawings in the embodiments of the present invention. Apparently, the described embodiments are only some of the embodiments of the present invention, but not all of them. Based on the embodiments of the present invention, all other embodiments obtained by those skilled in the art without creative efforts fall within the protection scope of the present invention. In addition, it should be understood that the specific embodiments described here are only used to illustrate and explain the present invention and are not intended to limit the present invention. In the present invention, unless stated otherwise, the used orientation words such as "up" and "down" usually refer to the up and down of the device in actual use or working state, specifically the directions in the drawings. The "inside" and "outside" refer to the outline of the installation.

Figure 1:
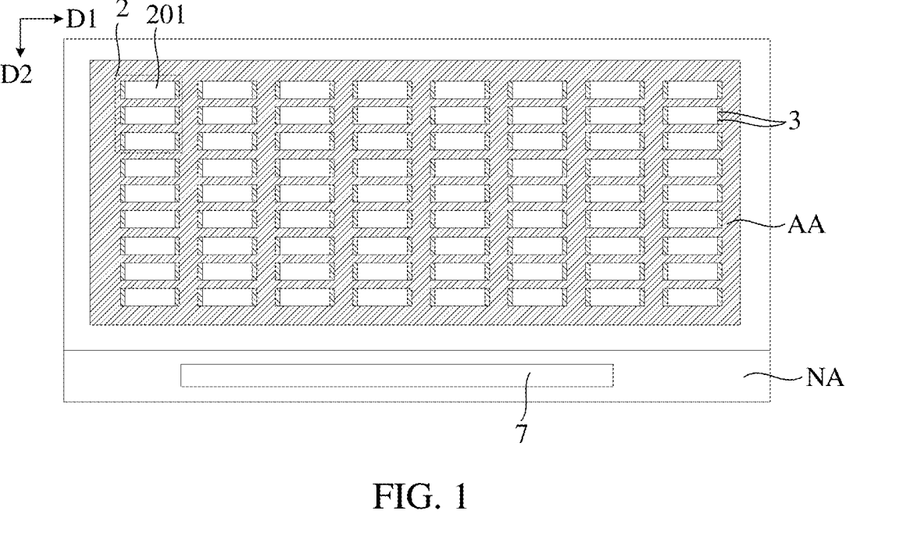
FIG. 1 is a schematic plan view of a curved display panel provided by an embodiment of the present invention.
Figure 2:
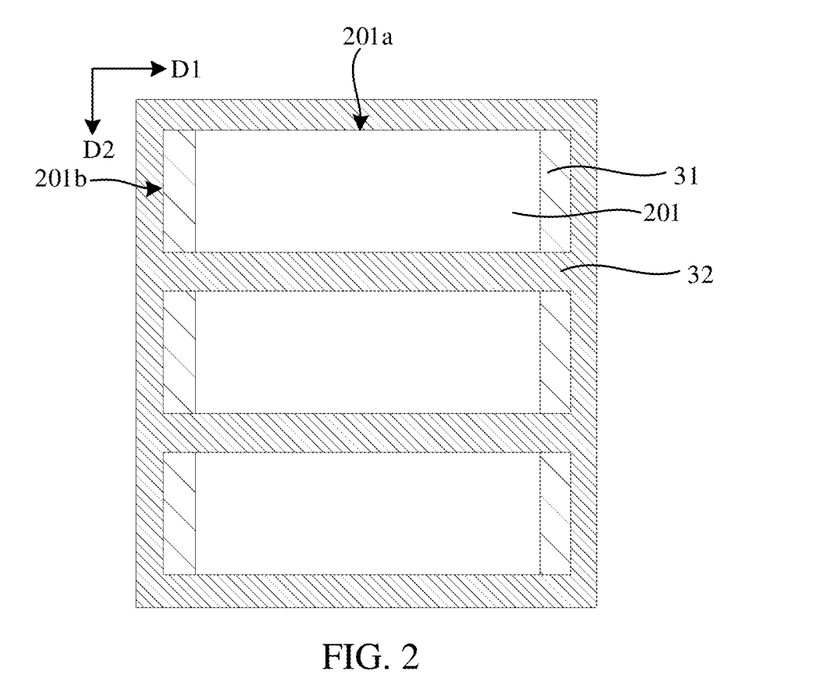
FIG. 2 is a schematic diagram of a positional relationship between a black matrix and sub-pixels in FIG. 1.

Referring to FIG. 1 and FIG. 2, an embodiment of the present invention provides a curved display panel. The curved display panel includes a first substrate 1, a plurality of pixel units 2, and a plurality of black matrices 3. The pixel unit 2 is disposed on the first substrate 1. Each pixel unit 2 includes a plurality of sub-pixels 201 disposed in an array along the first direction D1 and the second direction D2. Each of the sub-pixels 201 includes a long side 201a and a short side 201b. The long side 201a extends along the first direction D1, and the short side 201b extends along the second direction D2. The first direction D1 is a curved direction of the curved display panel, and the second direction D2 is perpendicular to the first direction D1.

A plurality of the black matrices 3 are disposed on a side of the sub-pixel 201 away from the first substrate 1. Each black matrix 3 includes a first sub-part 31 and a second sub-part 32. An orthographic projection of the first sub-part 31 on the first substrate 1 is located at an interval between orthographic projections of two adjacent sub-pixels 201 on the first substrate 1. An orthographic projection of the second sub-part 32 on the first substrate 1 overlaps with an orthographic projection of the short side 201b of the sub-pixel 201 on the first substrate 1.

As mentioned in the background, when the curved display panel in the prior art is bent, due to different curvatures of a color filter substrate and an array substrate, the black matrix 3 in the color filter substrate may be offset from the array substrate. This further causes light leakage and color mixing issues. In order to avoid light leakage, the black matrix 3 may be widened in the display panel, however, the widening of the black matrix 3 may reduce an aperture ratio of the display panel.

In view of this, the embodiment of the present invention extends the long side 201a of each sub-pixel 201 along the curved direction of the curved display panel. The orthographic projection of the first sub-part 31 of the black matrix 3 on the first substrate 1 is located at the interval between the orthographic projections of two adjacent sub-pixels 201 on the first substrate 1. The orthographic projection of the second sub-part 32 on the first substrate 1 overlaps with the orthographic projection of the short side 201b of the sub-pixel 201 on the first substrate 1. In order to improve the issues of light leakage and color mixing caused by the offset between the color filter substrate and the array substrate, each black matrix 3 needs to be widened. The short side 201b of the black matrix 3 in the present invention is widened. Compared with the widening of the long side 201a in the prior art, it is beneficial to reduce an area of the widened part of the black matrix 3. This can reduce the loss of the aperture ratio of each sub-pixel 201, thereby improving an overall aperture ratio of the curved display panel.

The curved display panel includes a display area AA and a non-display area NA disposed on at least one side of the display area AA. The sub-pixels 201 are disposed in the display area AA, and the scan lines 4 and the data lines 5 are at least located in the display area AA. The non-display area NA is a frame area of the curved display panel.

The curved display panel of this embodiment has a bending axis perpendicular to the first direction D1. For example, the curved axis may pass through the center of the curved display panel, and the two parts of the curved display panel corresponding to the two sides of the bending axis are bent with an imaginary axis parallel to the direction of the bending axis as the bending axis. The curved display panel is curved along the bending axis. In the embodiment of the present invention, the first direction D1 is the horizontal direction, and the second direction D2 is the vertical direction. In short, the first direction D1 is a horizontal direction, and the second direction D2 is a vertical direction.

The curved display panel in the embodiment of the present invention is a horizontal screen. That is, the long side of the curved display panel extends along the first direction D1. The short side of the curved display panel extend along the second direction D2.

The first substrate 1 may be a flexible substrate. The flexible substrate may include two flexible substrates and a barrier layer disposed between the two flexible substrates. The materials of the two flexible substrates are independently selected from one of polyimide, polyethylene naphthalate, polyethylene terephthalate, polyarylate, polycarbonate, polyetherimide and polyethersulfone. The material of the barrier layer can be selected from inorganic materials such as silicon oxide, silicon nitride, silicon oxynitride and their stacks, and is used to prevent water vapor from diffusing from the flexible substrate to the driving circuit layer.

Figure 3:
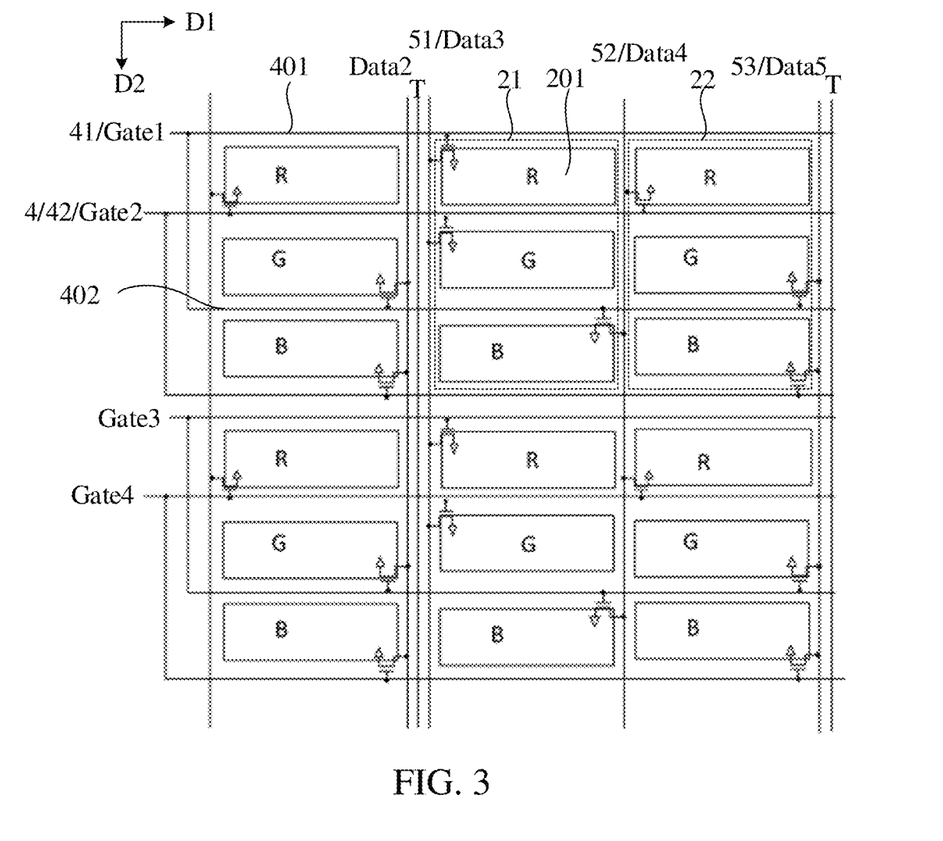
FIG. 3 is a schematic diagram of a simplified arrangement of some sub-pixels of a curved display panel provided by an embodiment of the present invention.
Figure 4:
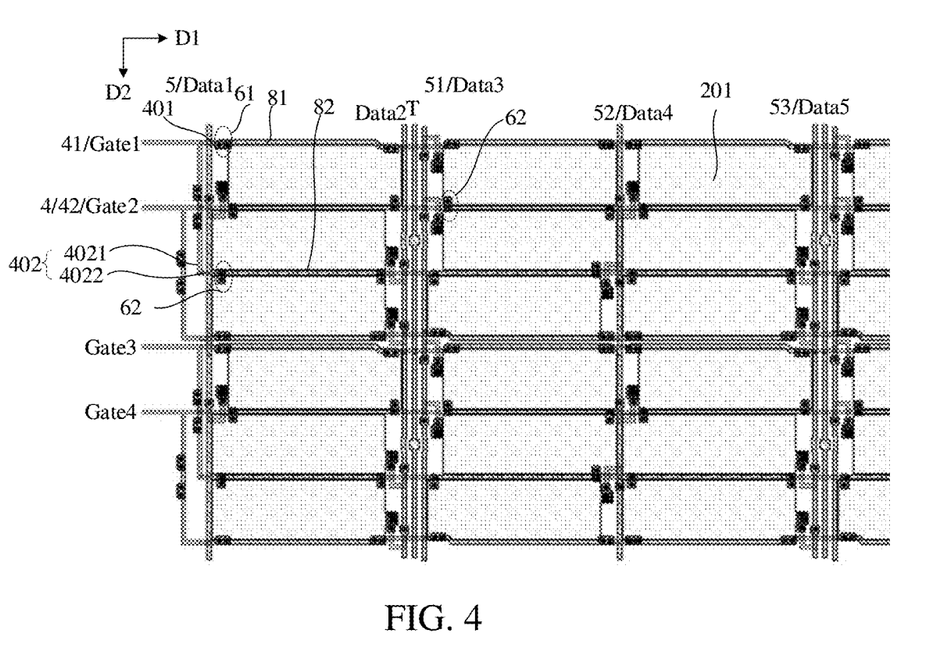
FIG. 4 is a top view structural diagram of some sub-pixels of a curved display panel in FIG. 3.

Referring to FIG. 3 and FIG. 4, the first substrate 1 is provided with a plurality of scan lines 4 extending along the first direction D1 and a plurality of data lines 5 extending along the second direction D2. The intersection of the scan line 4 and the data line 5 defines the pixel unit 2. Two adjacent pixel units 2 arranged along the first direction D1 are driven by two scan lines 4. The reason for this setting is that, if the driving method of the horizontally placed sub-pixels 201 in the embodiment of the present invention still adopts the driving method of the vertically placed sub-pixels 201 in the conventional technology, the curved display panel in the embodiment of the present invention is a horizontal screen, the sub-pixels 201 are arranged in more rows in the lateral direction. If the scan lines 4 are still kept extending horizontally and the data lines 5 are still kept extending vertically, the number of required scan lines 4 is increased, however, the excessive number of the scan lines 4 may easily cause the charging time of the sub-pixels 201 to be prolonged, thereby reducing the driving capability.

Taking the resolution of the curved display panel as 1:2 as an example for illustration, the long side is twice the short side. That is, the number of required scan lines 4 is doubled, and the number is greatly increased. However, in the embodiment of the present invention, a design in which two adjacent pixel units 2 are driven by two scan lines is adopted. The number of the scan lines 4 becomes 4/3≈1.33 times of the original, which is less than 2 times. That is, it is beneficial to reduce the number of the scan lines 4, therefore, the above issues can be improved to a certain extent.

Specifically, the two scan lines that drive the first pixel unit 21 and the second pixel unit 22 are defined as a first scan line 41 and a second scan line 42, that is, the first scan line 41 and the second scan line 42. The first pixel unit 21 and the second pixel unit 22 respectively include three sub-pixels 201 arranged along the second direction D2. The two sub-pixels 201 on both sides are connected to one of the first scan line 41 and the second scan line 42. The sub-pixel 201 located in the middle is connected to the other one of the first scan line 41 and the second scan line 42.

In the embodiment of the present invention, each scan line 4 includes a first branch 401 and a second branch 402 connected to each other. The first branch 401 extends along the first direction D1. The second branch 402 includes a first subsection 4021 and a second subsection 4022. The first subsection 4021 is located between the first branch 401 and the second subsection 4022 and is connected to both. The first subsection 4021 extends along the second direction D2, and the second subsection 4022 extends along the first direction D1. The sub-pixels 201 arranged along the first direction D1 are separated by two rows between the first branch 401 and the second sub-section 4022.

The first branch 401 is used to provide scanning signals to the sub-pixels 201 in the same row. The second branch 402 is used to provide scanning signals to the sub-pixels 201 in the same row. The first branch 401 and the second branch 402 input the same scanning signal.

Further, continue to refer to FIG. 3 and FIG. 4, in the embodiment of the present invention, an adaptive design is also performed on the arrangement of the data lines 5. Two adjacent pixel units 2 arranged along the first direction D1 are driven by three data lines 5. Compared with one data line 5 in a conventional pixel arrangement independently driving a column of sub-pixels 201, that is, each pixel unit 2 is driven by three data lines 5, two adjacent pixel units 2 are driven by six data lines 5, and the number of data lines 5 in the embodiment of the present invention is reduced to half.

Specifically, the three data lines 5 are defined as a first data line 51, a second data line 52, and a third data line 53. The first data line 51 is located on a side of the first pixel unit 21 away from the second pixel unit 22. The second data line 52 is located on a side of the second pixel unit 22 away from the first pixel unit 21. The third data line 53 is located between the first pixel unit 21 and the second pixel unit 22. The third data line 53 is connected to any one of the sub-pixels 201 in the first pixel unit 21 and any one of the sub-pixels 201 in the second pixel unit 22. The first data line 51 is connected to all the sub-pixels 201 in the first pixel unit 21 that are not connected to the third data line 53. The second data line 52 is connected to all the sub-pixels 201 in the second pixel unit 22 that are not connected to the third data line 53.

In the embodiment of the present invention, the third data line 53 drives part of the sub-pixels 201 in the first pixel unit 21 and part of the sub-pixels 201 in the second pixel unit 22 at the same time. The first data line 51 simultaneously drives part of the sub-pixels 201 in the first pixel unit 21 and part of the sub-pixels 201 in another pixel unit located on the side of the first pixel unit 21 away from the second pixel unit 22. The second data line 52 simultaneously drives part of the sub-pixels 201 in the second pixel unit 22 and part of the sub-pixels 201 in another pixel unit 2 located on the side of the second pixel unit 22 away from the first pixel unit 21. Therefore, one data line 5 simultaneously drives the sub-pixels 201 in two pixel units 2 in different columns. Compared with one data line 5 in the conventional pixel driving scheme to only drive the sub-pixels 201 in the pixel units 2 of the same column, the number of the data lines 5 in the curved display panel is reduced.

It can be understood that adopting this design has the following advantages, which will be described in detail below.

First, the non-display area NA is provided with a demultiplexer 7 (Mux) device and a driving chip. The demultiplexer 7 is configured to demultiplex wires electrically connected to the driving chip into a plurality of signal wires in proportion. The signal wires are connected to the data lines 5 in a one-to-one correspondence. The number of signal wires is the same as the number of data lines 5. For example, the demultiplexer 7 is configured to decompose the wires of the driving chip into multiple signal wires in the ratio of m/n, m is the total number of signal wires and n is the total number of wires. In the embodiment of the present invention, the number of data lines 5 is reduced to half, and therefore, the number of required signal wires is correspondingly reduced by half. The aforementioned ratio is reduced, that is, the number of the signal wires into which the demultiplexer 7 demultiplexes one wire of the driving chip is reduced. Therefore, the occupied area of the demultiplexer 7 can be reduced, which is beneficial to reduce the area of the non-display area NA. This is beneficial to realize a narrow frame and improve the appearance effect of the curved display panel.

Even speaking, when the number of wires electrically connected to the driving chip is the same as the number of signal wires, that is, when the number of wires is the same as that of the data wires 5, the wires do not need to be decomposed into multiple signal wires. Therefore, in the embodiment of the present invention, the setting of the demultiplexer 7 can be canceled, thereby avoiding the feedthrough effect caused by the demultiplexer 7. This helps to improve the area flickering issue of the curved display panel and improve the display quality.

Second, the reduction in the number of the data lines 5 is beneficial to reduce the number of the driving chips used to provide the driving signals for the data lines 5, thereby reducing the cost.

Third, the reduction in the number of the data lines 5 is equivalent to the reduction in the number of metal wires on the curved display panel. As the occupied area of the metal wires decreases, the size of the black matrix 3 used to shield the metal wires can be reduced, thereby further increasing the aperture ratio of the curved display panel.

Figure 5:
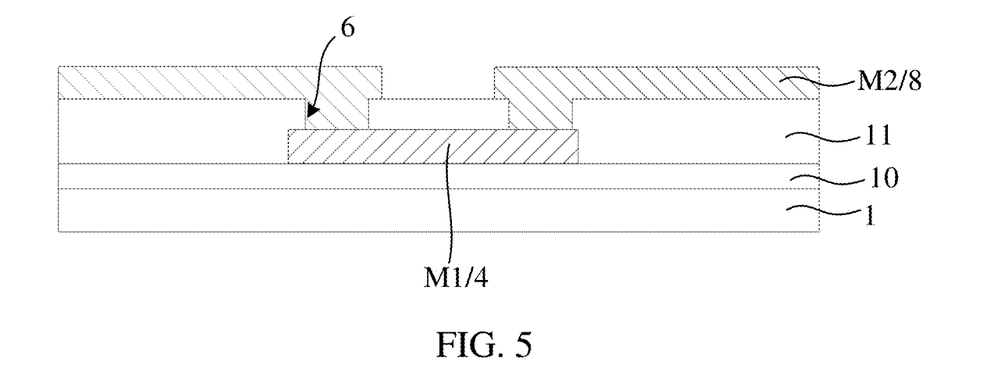
FIG. 5 is a schematic diagram of a partial cross-sectional structure of a curved display panel in FIG. 4.

In an embodiment of the present invention, referring to FIG. 4 and FIG. 5, the curved display panel further includes a first metal layer M1, an insulating layer 10, and a second metal layer M2. The first metal layer M1 is disposed on one side of the first substrate 1, and the first metal layer M1 includes the scan lines 4. The insulating layer 10 is disposed on a side of the first metal layer M1 away from the first substrate 1. The second metal layer M2 is disposed on a side of the insulating layer 10 away from the first substrate 1. The second metal layer M2 includes the data lines 5 and the conversion lines 8. The data line 5 and the conversion line 8 do not overlap. The scan line 4 is electrically connected to the conversion line 8 through the via hole 6 penetrating through the insulating layer 10.

The reason for such setting is that the resistivity of the first metal layer M1 is greater than the resistivity of the second metal layer M2. By electrically connecting the scan line 4 on the first metal layer M1 to the conversion line 8 on the second metal layer M2, the resistance of the scan line 4 can be reduced, which is beneficial to improve the charging capability.

In the embodiment of the present invention, the conversion line 8 includes a first conversion line 81 and a second conversion line 82. The via holes 6 include a first via hole 61 and a second via hole 62. The second subsection 4022 is electrically connected to the first conversion line 81 through the first via hole 61. The first branch 401 is electrically connected to the second conversion line 82 through the second via hole 62. The first conversion line 81 and the second conversion line 82 extend along the first direction D1. It can be understood that both the first branch 401 and the second branch 402 adopt a line-changing design, which is beneficial to further reduce the resistance of the scan line 4 and further improve the charging capacity.

Figure 6:
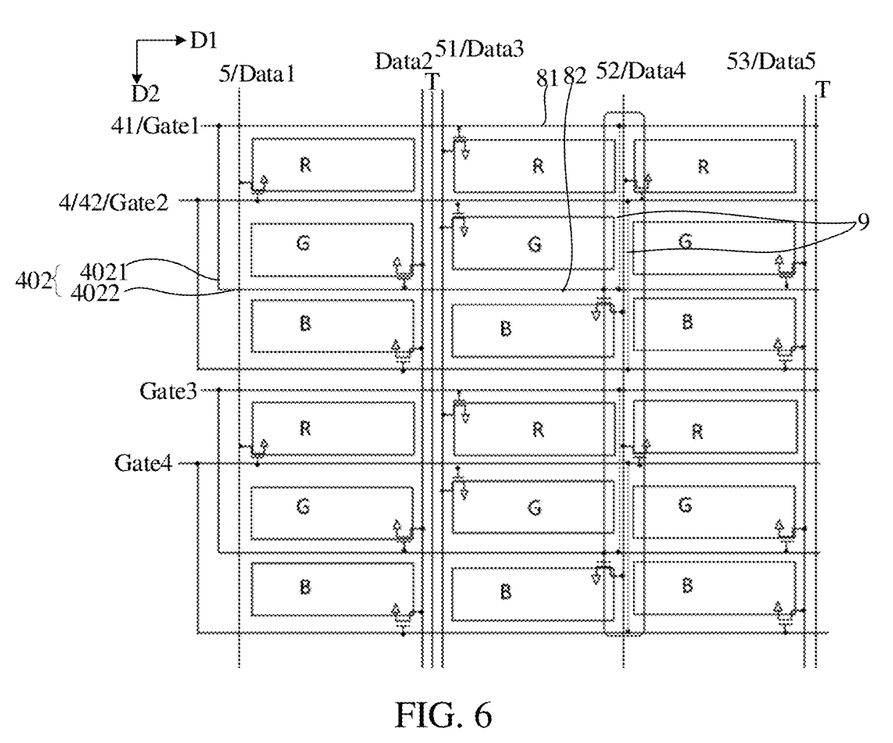
FIG. 6 is a simplified schematic diagram of another arrangement of some sub-pixels of a curved display panel in FIG. 3.
Figure 7:
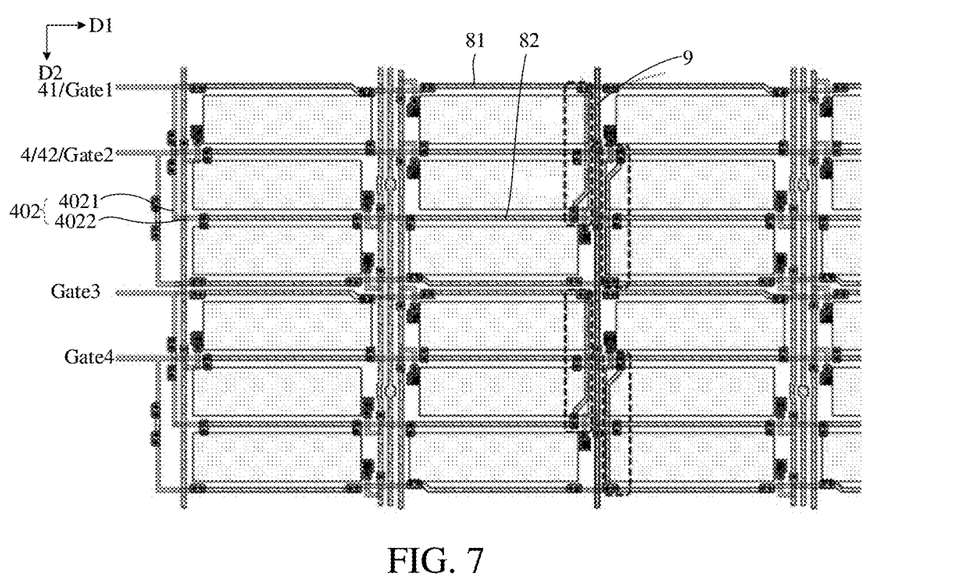
FIG. 7 is another top view structural diagram of some sub-pixels of a curved display panel in FIG. 6.

In the embodiment of the present invention, refer to FIG. 6 and FIG. 7, the difference from FIG. 3 and FIG. 4 is that the second metal layer M2 also includes connection lines 9. The connection line 9 is electrically connected to the first conversion line 81 and the second conversion line 82. The connection line 9 extends along the second direction D2. The reason for such setting is that the same two rows of the scan lines 4 inside the display area AA are connected through the connection line 9, such that driving capabilities of the same two rows of the scan lines 4 are the same. This avoids the issue of displaying differences from line to line.

The curved display panel may be a touch display panel, and further includes a touch wire T. The touch wire T is disposed between two adjacent columns of the sub-pixels 201 and extends along the second direction D2.

In the embodiment of the present invention, the curved display panel may be a liquid crystal display panel, but it is not limited thereto. In other embodiments, the curved display panel may also be other suitable types of display panels such as a light-emitting diode (LED) display panel, a micro light-emitting diode (micro LED or mini LED) display panel, or an organic light-emitting diode (OLED) display panel.

Figure 8:
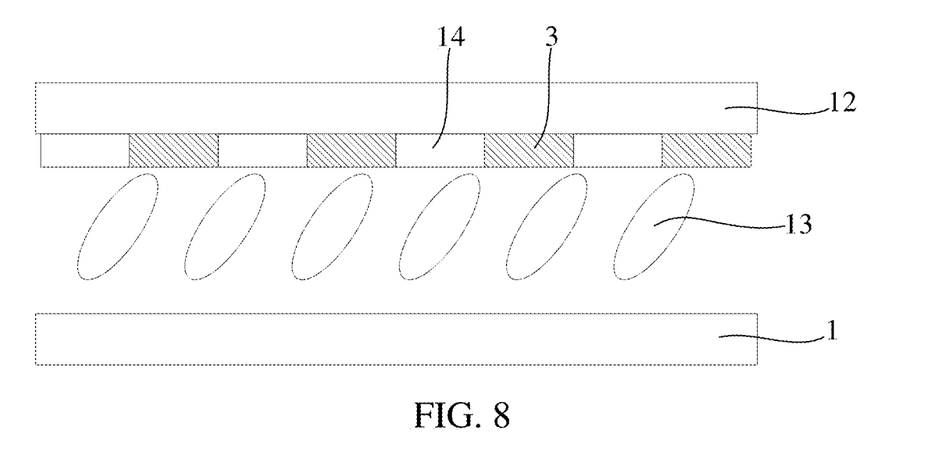
FIG. 8 is a schematic cross-sectional structure diagram of a curved display panel provided by an embodiment of the present invention.

Refer to FIG. 8, taking the curved display panel as an example of a liquid crystal display panel, the curved display panel further includes a second substrate 12 and a liquid crystal layer 13. The second substrate 12 is opposite to the first substrate 1. The liquid crystal layer 13 is disposed between the first substrate 1 and the second substrate 12. The black matrix 3 is disposed on a side of the second substrate 12 close to the first substrate 1.

A plurality of color resists 14 are also arranged on the second substrate 12, the color resists 14 are arranged corresponding to the sub-pixels 201, and the black matrix 3 is arranged between two adjacent color resists 14.

A sealant is further disposed between the first substrate 1 and the second substrate 12, and the sealant corresponds to the non-display area NA of the curved display panel.

The embodiment of the present invention also provides a display device. The display device includes the curved display panel and a backlight module in the above embodiments. The backlight module is arranged on a side away from the light emitting surface of the curved display panel. The backlight module may, for example, include at least one light source to provide light to the curved display panel and use the light to display images. In order to adapt to the curved display panel, the backlight module in the embodiment of the present invention may also have a curved structure.

The display device includes but not limited to electronic paper, mobile phone, tablet computer, television, monitor, notebook computer, digital photo album, GPS, etc.

The beneficial effects of embodiments of the present invention are that: The curved display panel and the display device provided by the present invention extend the long side of each sub-pixel along the curved direction of the curved display panel. The orthographic projection of the first sub-part of the black matrix on the first substrate is located at the interval between the orthographic projections of two adjacent sub-pixels on the first substrate. The orthographic projection of the second sub-part on the first substrate overlaps with the orthographic projection of the short side of the sub-pixel on the first substrate. In order to improve light leakage and color mixing issues caused by the offset between the color filter substrate and the array substrate, each black matrix needs to be widened. However, the short side of the black matrix in the present invention is widened, which is beneficial to reduce the area of the widened part of the black matrix compared with the widening of the long side in the prior art. This can reduce a loss of an aperture ratio of each sub-pixel, thereby improving an overall aperture ratio of the curved display panel.

In summary, although the present invention has been disclosed above with preferred embodiments, the above preferred embodiments are not intended to limit the present invention. Those skilled in the art can make various changes and modifications without departing from the spirit and scope of the present invention. Therefore, the protection scope of the present invention shall be determined by the scope defined by the claims.

What is claimed is:

1. A curved display panel, comprising:
   a first substrate;
   a plurality of pixel units disposed on the first substrate, wherein each of the pixel units comprises a plurality of sub-pixels disposed in an array along a first direction and a second direction, each of the sub-pixels comprises a long side and a short side, the long side extends along the first direction, the short side extends along the second direction, the first direction is a direction of a curved surface of the curved display panel, and the second direction is perpendicular to the first direction; and
   a plurality of black matrices disposed on a side of the sub-pixel away from the first substrate, each of the black matrices comprises a first sub-part and a second sub-part, an orthographic projection of the first sub-part on the first substrate is located at an interval between orthographic projections of two adjacent sub-pixels on the first substrate, and an orthographic projection of the second sub-part on the first substrate overlaps with an orthographic projection of the short side of the sub-pixel on the first substrate;
   wherein the first substrate is provided with a plurality of scan lines extending along the first direction and a plurality of data lines extending along the second direction, an intersection of the scan line and the data line defines the pixel unit: two adjacent pixel units disposed along the first direction are driven by two scan lines;
   wherein defining two adjacent pixel units disposed along the first direction as a first pixel unit and a second pixel unit, and the two scan lines driving the first pixel unit and the second pixel unit are a first scan line and a second scan line;
   wherein the first pixel unit and the second pixel unit respectively comprise three sub-pixels disposed along the second direction, the two sub-pixels on both sides are connected to one of the first scan line and the second scan line, the sub-pixel located in a middle is connected to the other one of the first scan line and the second scan line.

2. The curved display panel according to claim 1, wherein each of the scan lines comprises a connected first branch and a second branch, and the first branch extends along the first direction;
   wherein the second branch comprises a first subsection and a second subsection, the first subsection is located between and connected to the first branch and the second subsection, the first subsection extends along the second direction, the second subsection extends along the first direction, and the first branch and the second subsection are separated by two rows of the sub-pixels disposed along the first direction.

3. The curved display panel according to claim 2, wherein the curved display panel further comprises:
   a first metal layer disposed on a side of the first substrate and comprising the scan lines;
   an insulating layer disposed on a side of the first metal layer away from the first substrate; and
   a second metal layer disposed on a side of the insulating layer away from the first substrate and comprising the data line and conversion line, wherein the data line and the conversion line do not overlap;
   wherein the scan line is electrically connected to the conversion line through a via hole penetrating through the insulating layer.

4. The curved display panel according to claim 3, wherein the conversion line comprises a first conversion line and a second conversion line, and the via hole comprises a first via hole and a second via hole;
   wherein the second subsection is electrically connected to the first conversion line through the first via hole, the first branch is electrically connected to the second conversion line through the second via hole, and the first conversion line and the second conversion line extend along the first direction.

5. The curved display panel according to claim 4, wherein the second metal layer further comprises a connection line, the connection line electrically connects the first conversion line and the second conversion line, and the connection line extends along the second direction.

6. The curved display panel according to claim 1, wherein two adjacent pixel units disposed along the first direction are driven by three data lines, and the three data lines are defined as a first data line, a second data line, and a third data line;
   wherein the first data line is located on a side of the first pixel unit away from the second pixel unit, the second data line is located on a side of the second pixel unit away from the first pixel unit, and the third data line is located between the first pixel unit and the second pixel unit;
   wherein the third data line is connected to any one of the sub-pixels in the first pixel unit and any one of the sub-pixels in the second pixel unit, the first data line is connected to all the sub-pixels in the first pixel unit that are not connected to the third data line, and the second data line is connected to all the sub-pixels in the second pixel unit that are not connected to the third data line.

7. The curved display panel according to claim 1, wherein the curved display panel further comprises:
a second substrate disposed opposite to the first substrate; and
a liquid crystal layer disposed between the first substrate and the second substrate;
wherein the black matrices are disposed on a side of the second substrate close to the first substrate.

8. A display device, comprising:
a curved display panel, comprising:
a first substrate;
a plurality of pixel units disposed on the first substrate, wherein each of the pixel units comprises a plurality of sub-pixels disposed in an array along a first direction and a second direction, each of the sub-pixels comprises a long side and a short side, the long side extends along the first direction, the short side extends along the second direction, the first direction is a direction of a curved surface of the curved display panel, and the second direction is perpendicular to the first direction; and
a plurality of black matrices disposed on a side of the sub-pixel away from the first substrate, each of the black matrices comprises a first sub-part and a second sub-part, an orthographic projection of the first sub-part on the first substrate is located at an interval between orthographic projections of two adjacent sub-pixels on the first substrate, and an orthographic projection of the second sub-part on the first substrate overlaps with an orthographic projection of the short side of the sub-pixel on the first substrate;
wherein the first substrate is provided with a plurality of scan lines extending along the first direction and a plurality of data lines extending along the second direction, an intersection of the scan line and the data line defines the pixel unit: two adjacent pixel units disposed along the first direction are driven by two scan lines;
wherein defining two adjacent pixel units disposed along the first direction as a first pixel unit and a second pixel unit, and the two scan lines driving the first pixel unit and the second pixel unit are a first scan line and a second scan line;
wherein the first pixel unit and the second pixel unit respectively comprise three sub-pixels disposed along the second direction, the two sub-pixels on both sides are connected to one of the first scan line and the second scan line, the sub-pixel located in a middle is connected to the other one of the first scan line and the second scan line.

9. The display device according to claim 8, wherein each of the scan lines comprises a connected first branch and a second branch, and the first branch extends along the first direction;
wherein the second branch comprises a first subsection and a second subsection, the first subsection is located between and connected to the first branch and the second subsection, the first subsection extends along the second direction, the second subsection extends along the first direction, and the first branch and the second subsection are separated by two rows of the sub-pixels disposed along the first direction.

10. The display device according to claim 9, wherein the curved display panel further comprises:
a first metal layer disposed on a side of the first substrate and comprising the scan lines;
an insulating layer disposed on a side of the first metal layer away from the first substrate; and
a second metal layer disposed on a side of the insulating layer away from the first substrate and comprising the data line and conversion line, wherein the data line and the conversion line do not overlap;
wherein the scan line is electrically connected to the conversion line through a via hole penetrating through the insulating layer.

11. The display device according to claim 10, wherein the conversion line comprises a first conversion line and a second conversion line, and the via hole comprises a first via hole and a second via hole;
wherein the second subsection is electrically connected to the first conversion line through the first via hole, the first branch is electrically connected to the second conversion line through the second via hole, and the first conversion line and the second conversion line extend along the first direction.

12. The display device according to claim 11, wherein the second metal layer further comprises a connection line, the connection line electrically connects the first conversion line and the second conversion line, and the connection line extends along the second direction.

13. The display device according to claim 8, wherein two adjacent pixel units disposed along the first direction are driven by three data lines, and the three data lines are defined as a first data line, a second data line, and a third data line;
wherein the first data line is located on a side of the first pixel unit away from the second pixel unit, the second data line is located on a side of the second pixel unit away from the first pixel unit, and the third data line is located between the first pixel unit and the second pixel unit;
wherein the third data line is connected to any one of the sub-pixels in the first pixel unit and any one of the sub-pixels in the second pixel unit, the first data line is connected to all the sub-pixels in the first pixel unit that are not connected to the third data line, and the second data line is connected to all the sub-pixels in the second pixel unit that are not connected to the third data line.

14. The display device according to claim 8, wherein the curved display panel further comprises:
a second substrate disposed opposite to the first substrate; and
a liquid crystal layer disposed between the first substrate and the second substrate;
wherein the black matrices are disposed on a side of the second substrate close to the first substrate.

15. The display device according to claim 8, wherein the curved display panel is a touch display panel, and the curved display panel further comprises a touch wire, and the touch wire is disposed between two adjacent columns of the sub-pixels and extends along the second direction.

16. The display device according to claim 8, wherein the curved display panel further comprises:
a backlight module, wherein the backlight module is disposed on a side away from a light emitting surface of the curved display panel, and the backlight module has a curved structure.

* * * * *